US008506286B1

(12) United States Patent
Hennemann et al.

(10) Patent No.: US 8,506,286 B1
(45) Date of Patent: Aug. 13, 2013

(54) TOOL CLOSING SYSTEM FOR PLASTIC BLOW MOLDING MACHINES

(75) Inventors: Ullrich Hennemann, Traismauer (AT); Detlef Müller, Schwabisch Hall (DE); Andreas Böhm, Berlin (DE)

(73) Assignee: Bekum Maschinenfabriken GmbH, Berlin (DE)

( * ) Notice: Subject to any disclaimer, the term of this patent is extended or adjusted under 35 U.S.C. 154(b) by 0 days.

(21) Appl. No.: 13/364,765

(22) Filed: Feb. 2, 2012

(51) Int. Cl.
*B29C 49/56* (2006.01)

(52) U.S. Cl.
USPC ........................................ 425/541; 425/450.1

(58) Field of Classification Search
USPC .................... 425/541, 450.1, 451.9
See application file for complete search history.

(56) References Cited

U.S. PATENT DOCUMENTS

| 5,354,196 | A | * | 10/1994 | Ziv-Av | 425/450.1 |
| 5,578,329 | A | * | 11/1996 | Hehl | 425/450.1 |
| 5,700,502 | A | * | 12/1997 | Hehl | 425/450.1 |
| 5,811,141 | A | * | 9/1998 | Pickel et al. | 425/450.1 |

FOREIGN PATENT DOCUMENTS

| DE | 4426521 C1 | 9/1995 |
| DE | 4443195 A1 | 6/1996 |
| DE | 19528751 A1 | 10/1996 |
| EP | 0554068 | 8/1993 |
| WO | 9619331 | 6/1996 |

OTHER PUBLICATIONS

Search Report from Corresponding EP Application, May 2, 2011.

* cited by examiner

*Primary Examiner* — James Mackey
(74) *Attorney, Agent, or Firm* — Greer, Burns & Crain, Ltd.

(57) ABSTRACT

A tool closing system for plastic blow molding machines comprises a drive base plate, a front mold clamping plate and a rear mold clamping plate positioned between the front clamping plate and the base plate. The base plate, front clamping plate, and rear clamping plate are shiftably arranged on guides which are mounted on a carriage. A drive device is fastened to the base plate and comprises an extensible and retractable drive rod which is articulated to the rear clamping plate for force transmission without bending moment. Two substantially C-shaped or U-shaped frame elements are arranged side by side in parallel with the guides. Each have a substantially horizontally extending central web and two substantially vertically extending webs. A respective one of the two vertical webs is articulated to the base plate and the other vertical web is articulated to the front clamping plate.

11 Claims, 6 Drawing Sheets

TOOL CLOSING SYSTEM FOR PLASTIC BLOW MOLDING MACHINES

FIELD OF THE INVENTION

The present invention refers to a tool closing machine for plastic blow molding machines.

BACKGROUND OF THE INVENTION

Various designs of tool closing systems for blow molding machines are known. A design used by various machine manufacturers accomplishes a symmetrical force introduction via a drive arranged underneath the mold and a symmetrical lever mechanism. In practice, however, this bottom type drive is objectionable in various production variants. Moreover, due to the lever mechanism used, the mechanical structure is relatively complicated and an increase in the opening stroke is only possible with great difficulty.

A further common design is the so-called 3-plate system. The drive is arranged in this system behind the third plate (so-called crosshead). The synchronous movement of the two mold halves towards a joint mold parting plane is normally ensured via rack or lever synchronization. Advantages of this system are the relatively easy compensation of different mold thicknesses and strokes and the ease of access to the mold from below for cooling, waste belts and bottom-type blow station. Of disadvantage are the deformations in the area of the guides of the closing plate, the deformations being particularly caused by the bending moment produced due to the system on the front closing plate. Comparatively great efforts are required for compensating for such deformations. Especially in the case of large mold projections, problems arise with respect to the force distribution, which problems cannot easily be solved by the structural design of the whole force system.

Further known closing unit systems also work with a drive located at the "rear" and try to prevent the introduction of any bending into the guide system of the mold clamping plate by way of very complexly designed lever mechanisms or intermediate plates.

SUMMARY OF THE INVENTION

It is the object of the present invention to indicate a closing system that rules out the introduction of bending moments into the plate guiding elements, has a very simplified structure for reasons of costs and permits the greatest possible accessibility underneath the blow molds. The possibility of different mold thicknesses and opening strokes shall be maintained as in the known 3-plate system.

This object is achieved according to the invention as described herein. Advantageous designs of the invention are characterized below.

According to the invention the system regarding the guide elements of the mold clamping plates, which guide elements may e.g. be linear guides, cross beams or other suitable systems, is connected to the system for transmitting force into the mold clamping plates in such a way that an introduction of bending moments into the guide elements by the force transmission system is ruled out. Two so-called C frame elements or approximately U-shaped frame elements that are arranged in parallel side by side are used for the force transmission between the mold clamping plates. The selected arrangement has the effect that the deformations arising in the force transmission system have no impact on the guiding quality of the mold clamping plates, which thereby remain in parallel with each other all the time. The system according to the invention causes the occurrence of deformations almost exclusively in the area of the C-shaped frame elements, but not in the area of the guides. Thanks to the simple kinematic structure with just two articulation points of the frame elements it is ensured that it is possible to produce a tool closing system which is advantageous with respect to costs.

The C-shaped frame elements may also be composed of several parts, e.g. cross beams and end pieces.

The points of articulation for force transmission from the C-frame to the mold clamping plate and the drive base plate can be produced in different variants. Known and generally common are e.g. bolt constructions or axial thrust bearings with pivoting option. A force transmission mainly without any bending moments via the points of articulation is just important for the function according to the invention. Instead of the articulations without any bending moments, bending articulations of a corresponding variant are also feasible.

A further advantage of the tool closing system according to the invention is the ease of access to the mold from below for a bottom type blow station and for bottom calibration.

According to a further configuration of the invention the drive base plate and the two mold clamping plates are firmly connected to attachments to which the substantially C-shaped frame elements and the drive rod, respectively, are hinged, the attachments of the two mold clamping plates extending substantially over the whole width thereof, so that the forces can be introduced perfectly distributed over the whole width into the blow molding area. In the loaded state the mold clamping plates are not bent, nor do they lead to a tilt movement around the guides, but they remain completely parallel to each other. The guide elements of the mold clamping plates are not used for the transmission of the closing force.

With great advantage it is further provided that the articulation points where the drive rod transmits the closing force to the attachment of the rear mold clamping plate, and where the force transmission to and from the C-shaped frame elements takes place, are located along a common horizontal line that coincides with the longitudinal central axis of the drive rod in height.

The substantially C-shaped frame elements can be formed by flat sheets of a suitable thickness, wherein the bend of the two angled edge webs can be less than 0.5 millimeter in case of load.

The tool closing system according to the invention is suited for different mold thicknesses and opening strokes. The calibration process causes extremely little wear.

The system according to the invention is suited for both single-side and multi-side machines.

Further advantages and details of the invention become apparent from the following description and on the basis of the drawings.

DETAILED DESCRIPTION OF PREFERRED EMBODIMENTS

Figure 1:
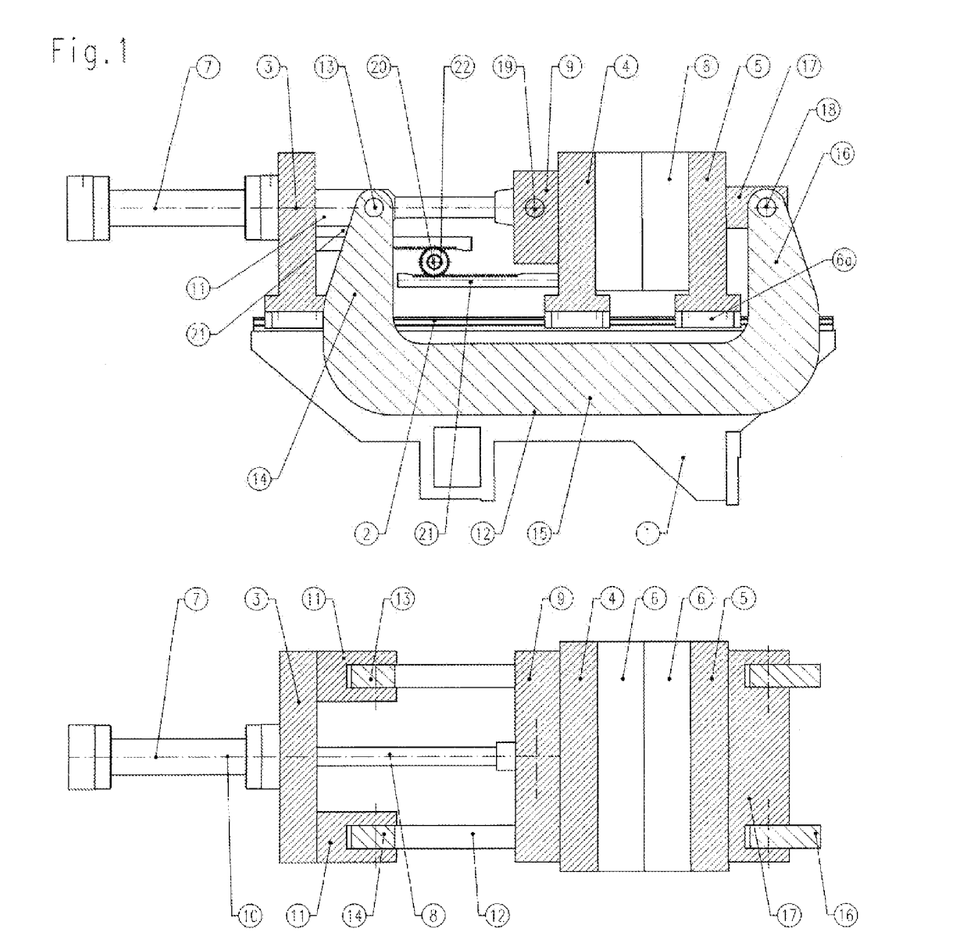
FIG. 1 shows an embodiment of the closing system according to the invention in the closed state in a purely schematic illustration and in a top view.

On a carriage 1, which is movable in transverse direction relative to the drawing plane between an extruder station and a blow station, guides 2 extending in the drawing plane are mounted and have movably seated thereon a drive base plate 3, a rear mold clamping plate 4 and a front mold clamping plate 5 that for this purpose are provided with guide elements 6 matching the guides 2. The mold halves of a blow mold 6 are fastened to the mold clamping plates 4 and 5.

A drive device 7 which is provided with an extensible and retractable drive rod 8 is mounted on the rear side of the drive base plate 3. The rear side of the rear mold clamping plate 4 has firmly attached thereto a plate-shaped attachment 9 which extends substantially over the whole width of the mold clamping plate 4 and to which the drive rod 8 is articulated, so that the rod can only transmit tensile and compressive forces extending in the direction of the longitudinal central axis 10 to the attachment 9 and thus to the rear clamping plate 4, but does not transmit bending moments.

The drive base plate, through which the drive rod passes centrally in width direction, has firmly attached thereto two lateral projections 11 to which two substantially C-shaped frame elements extending in parallel with the guides are articulated. The articulations are formed in the illustrated embodiment by bolts 13 that pass through associated holes in the upper end section of the substantially vertical rear web 14 of the frame element 12. The C-shaped frame element 12 further comprises a substantially horizontal middle web 15 which passes into a front, substantially vertical web 16 that in mirror image has the same shape as the rear vertical web 14.

Figure 2:
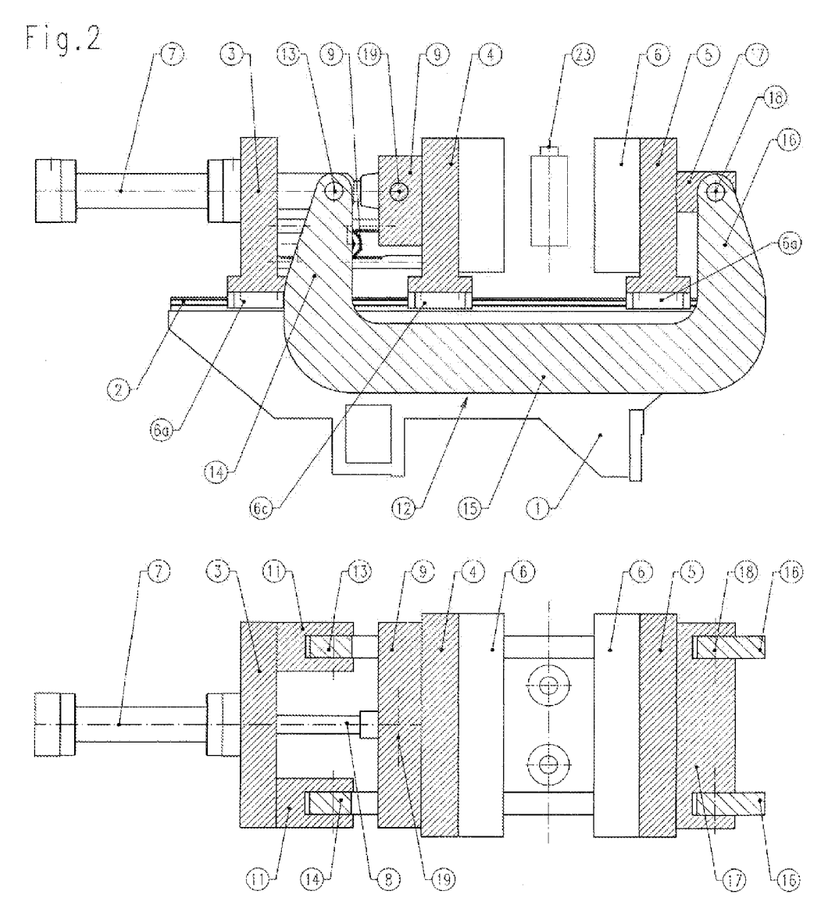
FIG. 2 shows the closing system of FIG. 1 in the opened state.

An attachment 17 which, just like the projection 9, extends almost over the whole width projects from the front mold clamping plate 5 to the front side of the tool closing system and is firmly connected to the mold clamping plate 5. The upper end section of the two substantially vertical webs 16 is hinged at the attachment 17 to articulation points 18 that in the figures are also illustrated as bolts. The articulation points 13 and 18 of the C-shaped frame elements 12 and the articulation point 19 to which the drive rod 8 is hinged are positioned at the same level, i.e. on the central longitudinal axis 7. Reference numeral 20 designates a synchronizing operation which includes two parallel racks 21 and an interposed gear 22. The racks 21 are fastened to the drive base plate 3 and to the rear mold clamping plate 4.

Figure 4:
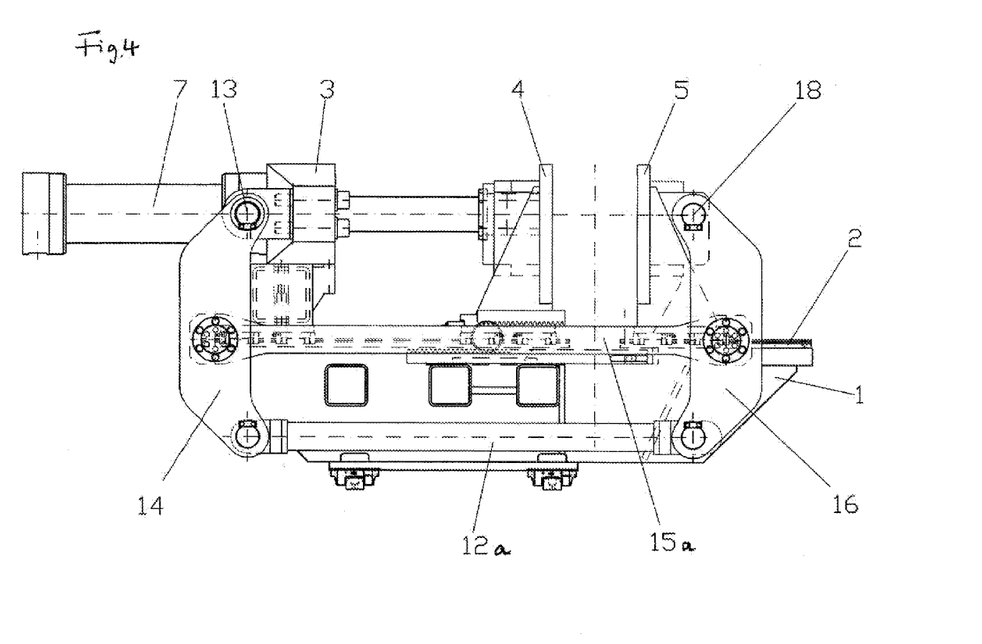
FIGS. 4-6 shows a second embodiment in illustrations corresponding to FIGS. 1 to 3.

In the state shown in FIG. 2 the mold clamping plates 4 and 5 with the mold halves 6 secured thereto are opened, so that a blown article 23 can be removed (or a new parison can be received at the extruder station). A comparison with FIG. 1 shows that the assembly consisting of the three plates 3, 4 and 5 and the C-shaped frame elements 12 is shifted to the right side in the illustration. When the closing force is transmitted from the drive device 7 and the drive rod 8, respectively, without any bending moments to the rear mold drive plate 4 and thus to the blow mold 6, force is simultaneously transmitted via the C-shaped frame element 12 to the front closing plate 5, the force being introduced substantially without any bending moments via the articulation point 13 into the C-shaped frame element 12 and via the articulation point 18 also substantially without any bending moments to the front closing plate 5. Due to the rearwardly directed reaction force the assembly consisting of the three plates 3, 4 and 5 and the C-shaped frame elements 12 is shifted to the left side on the guides 2 in the illustration of FIG. 1. The two C-shaped frame elements 12 are deformed in this process such that the two substantially vertical webs 14 and 16 are elastically bent apart, as shown in FIG. 4. When the mold 6 is opened, this has the effect that the assembly consisting of the three plates and the C-shaped frame elements is again shifted on the guides 2 to the right side.

Figure 3:
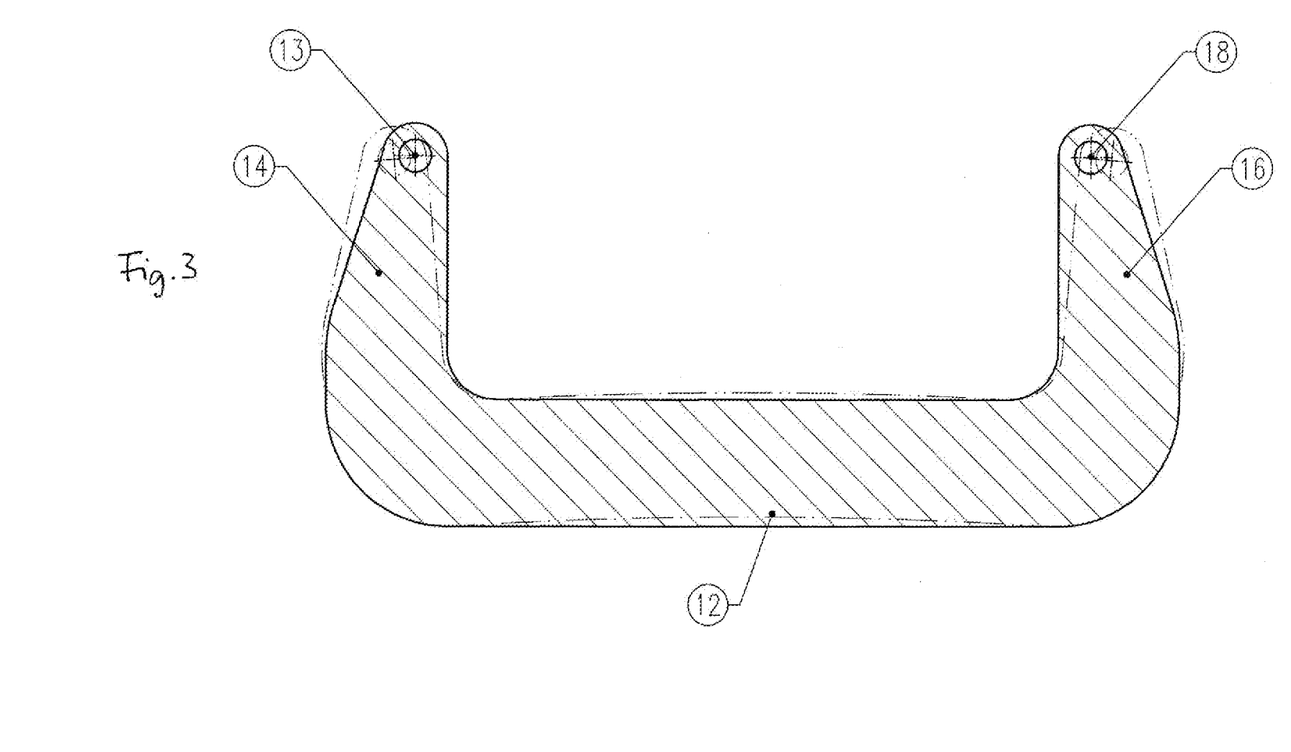
FIG. 3 is a view showing a C-shaped frame element with a deformation shown in broken line in case of load.

FIG. 3 is an enlarged view showing the approximately C- or U-shaped frame element 12 in continuous lines in the unloaded state and with deformation shown in broken line in case of load.

Figure 5:
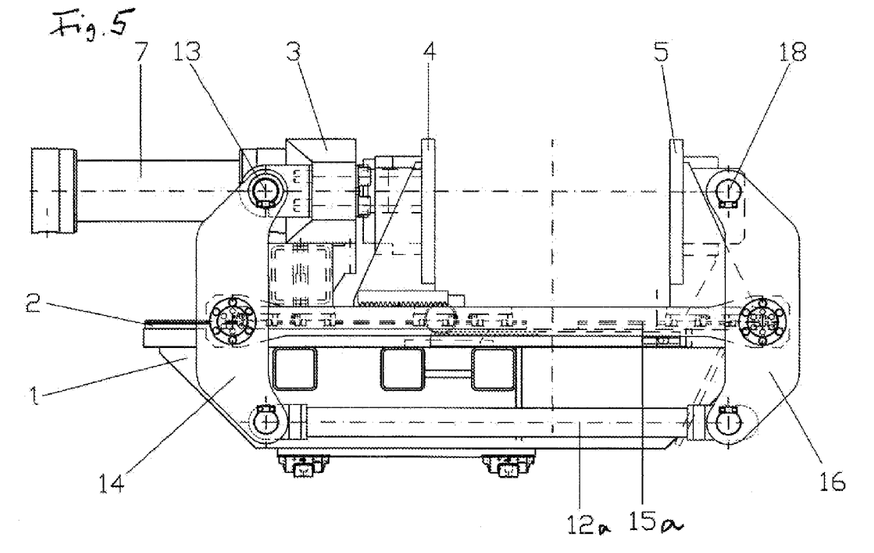
Figure 6:
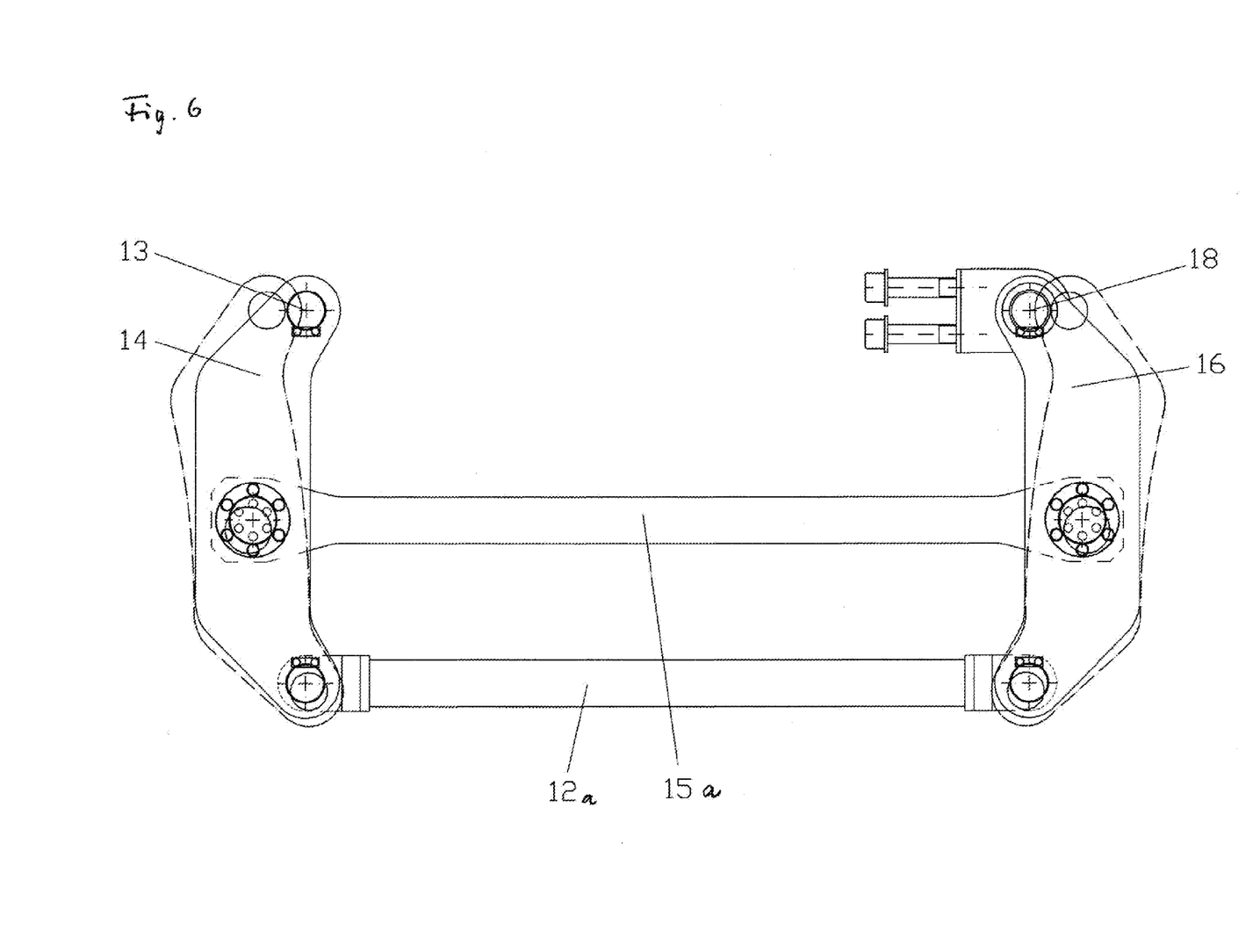

Since the C- or U-shaped frame element 12 is exposed to considerable stresses in the form of bending, elongation and compression, the frame element may be composed of different elements that are each only subject to one stress. FIGS. 4 to 6 show a second embodiment of the tool closing system according to the invention in illustrations corresponding to FIGS. 1 to 3. In this embodiment the substantially vertical webs 14 and 16, a lower horizontal web 12 and a horizontal web 15a arranged approximately at half the height of the vertical webs 14 and 15 are interconnected by articulations that are implemented by bolts. The closing force has such an impact on the separated elements that in the vertical elements 14 and 16 they cause a pure bending stress, in the horizontal element 12a a compressive stress, and in the case of the element 15a hinged approximately at half the height of the vertical elements 14 and 16, a tensile stress. A precondition for this is the free movability at all connection points.

Moreover, the structure of the second embodiment conforms to that of the first embodiment.

Due to their shape the C-shaped or U-shaped frame elements have the effect that the blow mold is freely accessible from both sides.

The invention claimed is:

1. A tool closing system for plastic blow molding machines comprising a drive base plate, a front mold clamping plate and a rear mold clamping plate positioned between the front mold clamping plate and the drive base plate, wherein the drive base plate, the front mold clamping plate, and the rear mold clamping plate, comprise guide elements which are shiftably arranged on guides which are mounted on a carriage, a drive device which is fastened to the drive base plate and comprises an extensible and retractable drive rod which is articulated to the rear mold clamping plate for force transmission without any bending moment, and two substantially C-shaped or approximately U-shaped frame elements which are arranged at a distance side by side in parallel with the guides and have each a substantially horizontally extending central web and two substantially vertically extending webs, wherein a respective one of the two substantially vertical webs is articulated to the drive base plate and the other substantially vertical web is articulated to the front mold clamping plate, wherein the substantially C-shaped or approximately U-shaped frame elements are shiftable with the drive base plate and the front mold clamping plate along the guides relative to the carriage.

2. The tool closing system according to claim 1, wherein the drive base plate and the two mold clamping plates are firmly connected to attachments to which the substantially C-shaped frame elements and the drive rod, respectively, are hinged.

3. The tool closing system according to claim 2, wherein the articulations of the drive rod to the rear mold clam in late and the articulation of the two substantially vertical webs to the drive base plate and the front mold clamping plate are positioned along a common line.

4. The tool closing system according to claim 3, wherein the articulations are formed by bolt constructions.

5. The tool closing system according to claim 3, wherein the articulations are formed by axial thrust bearings.

6. The tool closing system according to claim 1, wherein the substantially C-shaped or U-shaped frame elements are formed by flat sheets.

7. The tool closing system according to claim 1, wherein the frame elements consist of hingedly interconnected elements.

8. The tool closing system according to claim 1, wherein the drive device consists of a hydraulic, electrical or pneumatic drive or a combination thereof.

9. The tool closing system according to claim 2, wherein the substantially C-shaped or U-shaped frame elements are formed by flat sheets.

10. The tool closing system according to claim 2, wherein the frame elements consist of hingedly interconnected elements.

11. A tool closing system for plastic blow molding machines comprising:
- a carriage,
- at least one guide mounted on the carriage,
- a drive base plate, shiftably arranged on the guide,
- a front mold clamping plate, shiftably arranged on the guide,
- a rear mold clamping plate, shiftably arranged on the guide between the drive base plate and the front mold clamping plate,
- a drive device which is fastened to the drive base plate and comprises an extensible and retractable drive rod which is articulated to the rear mold clamping plate for force transmission without any bending moment, and
- at least two substantially C-shaped or approximately U-shaped frame elements, each comprising a substantially horizontally extending central web and two substantially vertically extending webs, wherein the frame elements are separate and independent of the carriage and are arranged in parallel with the guide, the substantially vertically extending webs are articulated to the drive plate and the front mold clamping plate, respectively, and wherein the frame elements are shiftable together with the drive base plate and front mold clamping plate along the guides.

* * * * *

UNITED STATES PATENT AND TRADEMARK OFFICE
CERTIFICATE OF CORRECTION

| | | |
|---|---|---|
| PATENT NO. | : 8,506,286 B1 | Page 1 of 1 |
| APPLICATION NO. | : 13/364765 | |
| DATED | : August 13, 2013 | |
| INVENTOR(S) | : Hennemann et al. | |

It is certified that error appears in the above-identified patent and that said Letters Patent is hereby corrected as shown below:

In the Claims:

In Column 4, Line 57 of the issued patent, please delete "clam in late" and replace with --clamping plate--

Signed and Sealed this
Thirtieth Day of December, 2014

Michelle K. Lee
*Deputy Director of the United States Patent and Trademark Office*